United States Patent [19]

Teig

[11] Patent Number: 4,611,722

[45] Date of Patent: Sep. 16, 1986

[54] MULTIPLE AND STORABLE WIND INSTRUMENT MUTE HOLDER

[76] Inventor: Carl W. Teig, 11037 Pleasant Valley Rd., Sun City, Ariz. 85351

[21] Appl. No.: 695,677

[22] Filed: Jan. 28, 1985

[51] Int. Cl.$^4$ .............................................. A47F 5/08
[52] U.S. Cl. .................................... 211/107; 248/229
[58] Field of Search ................ 211/107, 110, 111, 70; 248/443, 229; 84/DIG. 3, 387 A, 400

[56] References Cited

U.S. PATENT DOCUMENTS

| | | | |
|---|---|---|---|
| 169,962 | 11/1875 | Cross | 211/96 |
| 1,262,163 | 4/1918 | Beethoven | 248/229 |
| 1,342,136 | 6/1920 | Smith | 248/229 X |
| 1,379,761 | 5/1921 | Hawthorne | 248/230 |
| 1,466,057 | 8/1923 | Mathews | 248/229 X |
| 1,762,628 | 6/1930 | Hoyns | 211/110 |
| 2,559,739 | 7/1951 | Sherman | 211/70 |

Primary Examiner—J. Franklin Foss
Assistant Examiner—Sarah A. Lechok Eley
Attorney, Agent, or Firm—Harry M. Weiss & Associates

[57] ABSTRACT

An easily storable mute holder for securely holding a multiple number of wind instrument mutes and for removably mounting to a music stand is disclosed. The mute holder has a cylindrical member, having circular plates welded thereto, for accommodating a bolt which passes through centrally located apertures of the plates. A burr located at the bottom end of the bolt permits the bolt to traverse the entire length of the cylindrical member while stopping only to provide a threaded protrusion beyond the aperture of the upper plate to accommodate a locking nut. The bolt protrusion permits the stacking of arms or extensions having open-ended loops to securely hold the mutes. Spring clips are attached to distant portions of the cylindrical member to removably and adjustably mount the mute holder to the music stand.

8 Claims, 5 Drawing Figures

MULTIPLE AND STORABLE WIND INSTRUMENT MUTE HOLDER

BACKGROUND OF THE INVENTION

1. Field of the Invention

This invention generally relates to a wind instrument mute holder which can securely hold a multiple number of mutes and can be removably attached to a music stand. A multi-mute holder serves a musician in using various types of instrument mutes during the playing of selections where a rapid change of wind instrument mutes is required. A removable mute holder can be conveniently transported or carried, in addition to the wind instrument, within the instrument case.

2. Description of the Relevant Art

During the course of a musician's work, playing various types of music is essential which necessitates changing the tones of certain musical instruments. A musician, for example, who plays a wind instrument may have to play different tones for given instruments. In order to change the tone of a wind instrument, the musician inserts a device known as a mute having a frusto-conical shape into the bell of the instrument. Many different mutes may be needed during a short period of time, especially for musicians who are required to play a multiple number of wind instruments. Accordingly, the mutes must be readily available for all the different wind instruments which the musician plays.

In order to provide easy access to the different types of mutes which are necessary during the playing of different types of wind instruments, it is known in the related art to attach a mute holder to a music stand. The mute holder can be attached to a support such as a ledge of a music stand. However, the use of a mute holder attached to the ledge of a music stand would require a musician to reach out to the mute, thus creating a considerable inconvenience especially if the music player is required to make rapid changes of instruments or mutes.

It is also known in the related art that a mute holder having a main body constructed with a sheet material such as a sheet steel wherein the forward edge is formed into three substantially parallel forwardly projecting fingers can provide the spaces needed to engage and hold the mutes. However, the three parallel forwardly projecting fingers, described above, provide an undesirable limitation in the number of mutes which can be held.

A need was therefore felt to assist a musician by providing a holder capable of supporting a multiple number of mutes for easy access to the musician who may have to play different tones for given wind instruments during a short period of time.

It is therefore an object of the present invention to provide an improved mute holder for attachment to a music stand.

It is another object of the present invention to provide a mute holder which would hold the mutes directly in front of the musician during the playing of selections where change of instrument mutes is required to be made quickly and conveniently so as not to interfere with the musician's work.

It is still another object of the present invention to provide a mute holder composed of a plurality of movable and adjustably connected parts whereby the device can serve a player obliged to use two or more types of instrument mutes.

It is yet another object of the present invention to provide a mute holder which can be adjusted when mounted to the music stand to accommodate a musician's height.

It is yet another object of the present invention to provide a mute holder which can easily be removed from the music stand for transportation and may be conveniently carried, due to its construction, within a musical instrument case in addition to the instrument.

It is a further object of the present invention to provide a mute holder which can be easily and economically produced, yet sturdy in construction and highly efficient in operation.

It is a further object of the present invention to provide a mute holder which is constructed with extreme simplicity, embodying simple removable parts, and therefore capable of being retailed for a low price, long-lasting in use, and convenient to handle.

It is a more particular object of the present invention to provide a mute holder having a cylinder which can be removably attached to a music stand to act as a gripping unit for metal extensions to securely hold the instrument mutes.

It is another more particular object of the present invention to provide a mute holder having a removable mounting means to the music stand by introducing spring steel clips attached to the gripping unit.

SUMMARY OF THE INVENTION

The aforementioned and other objects of the present invention are accomplished by providing an adjustable and storable holder capable of being removably mounted to a music stand to support a plurality of mutes directly in front of a musician. The mute holder permits a musician, obliged to play different tones for given wind instruments, to have immediate access to different mutes. By further providing a tensioning means, the mutes can be properly secured to a gripping unit which accompanies the mute holder.

These and other features of the invention will be understood upon reading of the following description along with the drawings.

DESCRIPTION OF THE PREFERRED EMBODIMENTS

Figure 1:
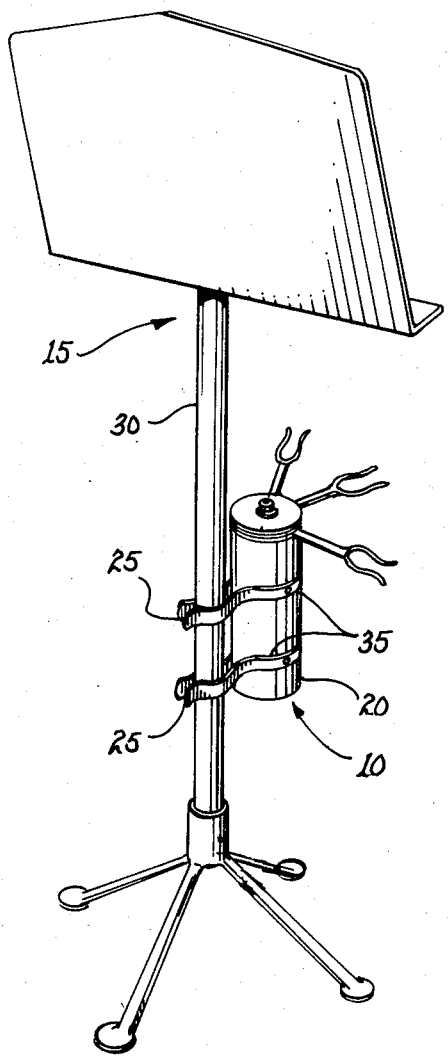
FIG. 1 is a perspective view of the preferred embodiment of a mute holder in accordance with the present invention showing the mute holder removably attached to a music stand.

FIG. 1 is a perspective view of a mute holder, generally designated by reference number 10, showing the mute holder removably mounted to a music stand 15. The mute holder 10 has a cylindrical member 20 preferably having a 2½-inch length and a 1 inch diameter. The cylindrical member 20 is, preferably, made out of steel.

For such a design, spring steel clips 25 are attached to the upper and lower portions of the cylindrical member 20. Each spring clip 25, protruding from the cylindrical member 20 provides a sufficient gripping force for securing the mute holder 10 to a vertical elongated member 30 of the music stand 15. The embodiments of the spring clips 25 provide the maximum surface area to produce ample friction for properly securing the mute holder 10 to the music stand 15. In order to provide a properly functioning device, the material of the spring clips 25 may be steel or the like to allow the non-gripping ends 35 of the clips 25 to be welded, pinned or riveted to the cylindrical member 20 of the mute holder 10. Moreover, the embodiments of the spring clips 25 permit the position of the cylindrical member 20 to be adjusted by permitting the cylindrical member 20 to slide upwards or downwards along the vertical member 30 of the music stand 15 to accommodate a musician's height.

Figure 2:
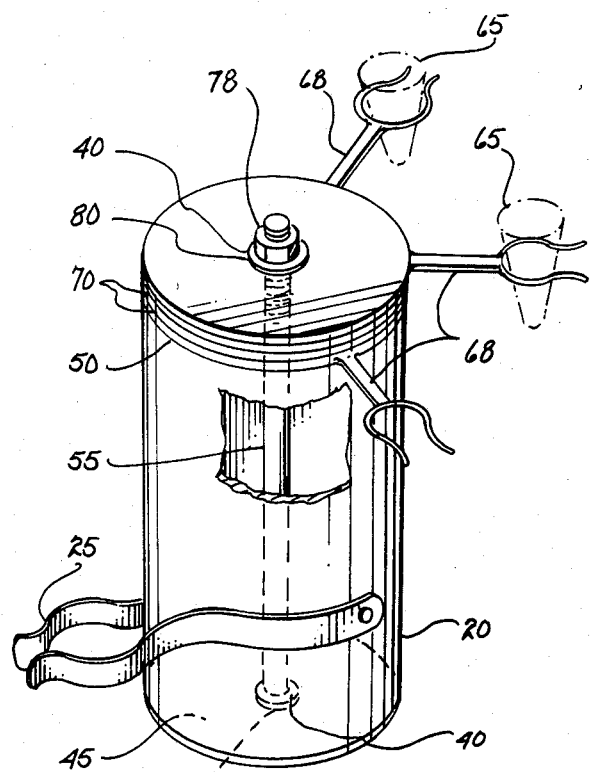
FIG. 2 is a sectional detail view of a preferred embodiment of a gripping unit employable in the present invention.
Figure 3A:
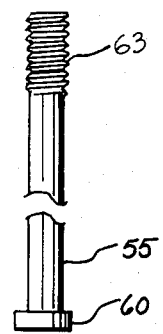
FIG. 3a is a side elevational view of a preferred embodiment of a bolt that passes through the inside and along an axis parallel to the length of a pipe which houses the gripping unit of the mute holder.

As shown in FIG. 2, the cylindrical member 20 has on its ends, circular plates 45, 50 welded thereto resulting in a closed cylindrical member except for apertures 40 through the centers of the plates 45, 50. Each aperture 40 centrally located at each end plate 45, 50 has a diameter large enough to accommodate a bolt 55 (see FIG. 3) which passes through the inside and along an axis parallel to the length of the cylinder 20. The bolt 55, shown in FIG. 3, may be ⅛ inch in diameter and 2¾ or 3 inches in length. Although the bolt 55 is preferably made of steel, the bolt 55 can also be made out of other types of lightweight and durable, but rigid materials, such as plastic. Further, the bolt 55 may have a burr 60 at one of its end while the opposite end may be partially threaded 63 or may be threaded all throughout its length. For such a design, the bolt 55 enters through the aperture 40 of the lower plate and traverses the entire length of the cylinder 20 until the bolt 55 passes through and protrudes beyond the aperture (not shown) of the upper plate 50.

Figure 3B:
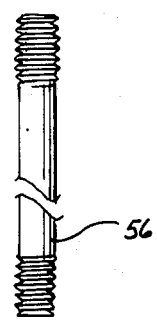
FIG. 3b is a side elevational view of an alternative embodiment of the bolt that passes through the inside and along an axis parallel to the length of the pipe which houses the gripping unit of the mute holder.

As shown in FIG. 3b, the bolt 56 can, alternatively, be partially threaded at both its ends or can be threaded all throughout its length. A nut, having on its inside diameter compatible threads with bolt 56, is welded at the bottom surface of the circular plate 45 of the cylinder 20 to permit the threaded bolt 56 to be secured thereto. For such a design, the bolt 56 enters through the aperture to the upper plate 50 and traverses the entire length of the cylinder 20 until the bolt 56 reaches the nut which has been welded to the lower plate 45 of the cylinder 20. Thereupon, the bolt 56 is rotated and secured into the nut.

Figure 4:
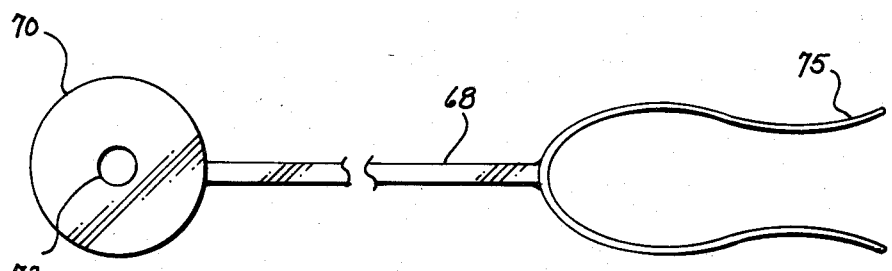
FIG. 4 is a top view of the extension of arm which is held by the upper portion of the gripping unit of the present invention.

FIG. 4 illustrates the top view of an arm or extension which is used for securely holding the wind instrument mutes 65 to the cylindrical member 20. The arms 68 preferably having a 3½-inch length, ½ inch width and 1/16 inch thickness, may be made out of lightweight and rigid material, such as steel or the like. As embodied in FIG. 4, the arm 68 has welded onto one of its ends a circular plate 70, also preferably made of steel, having a 1 inch diameter, a 1/16 inch thickness and an aperture 73 at its center with a diameter sufficient to permit the bolt 55, 56 to pass thereto. The other end of the arm 68 has welded onto it an open-ended metal loop 75 having a configuration as illustrated in FIG. 4. The circular plate 70 attached to the arm 68 rests on the upper plate 50 of the cylinder 20 in a manner that would permit the bolt 55, (or 56) to pass through the apertures located at the centers of the plates in both the cylinder 20 and the arm plate 70. The open-ended flexible metal loop 75 attached at the other end of the extension or arm 68 provides a suitable holding means for a mute 65. Generally, the inner diameter of the metal loop 75 may be 2½ inches while its opening may be 1½ inches, although the size of the loop 75 may vary depending on the type of mute to be held.

In order to provide a suitable holding means to securely hold a multiple number of mutes, a second extension will have its circular plate resting on a circular plate of a first extension while a third extension will have its plate rests on the plate of the second extension and so on. The maximum number of extensions which is utilized can be determined by the number of mutes needed for playing certain musical instruments or the number of mutes that can be held without exceeding the force necessary to grip the spring clips to the music stand 30, whichever is lesser. The end of the bolt 55, 56 that protrudes beyond the upper portion of the cylinder is fitted through each aperture 73 of each plate 70 of the extension 68. When the mute holder is in use, the edges of the plates 70 are preferably flushed with the cylinder 20 edge to preclude unnessary touching of the adjacent surface of the vertical member 30 of the music stand 15.

In order to properly secure the extensions to the cylindrical member 20, a nut 78 is screwed onto the protrusion of the bolt 55, 56 which extends beyond the plate of the uppermost extension. A washer 80 having a larger diameter hole than the outer diameter of the bolt 55, 56 is fitted during assemblage so that the washer 80 rests between adjacent surfaces of the plate of the uppermost extension and the nut 78. The nut 78 is rotated to a sufficient torque to properly secure the assemblage.

The above description is included to illustrate the operation of the preferred embodiments and is not meant to limit the scope of the invention. The scope of the invention is to be limited only by the following claims. From the above discussion, many variations are apparent to one skilled in the art which would yet be encompassed by the spirit and scope of the invention.

What is claimed is:

1. A mute holder for use with a music stand having a vertical member, comprising:
   a rigid cylindrical member attached at a position parallel to said vertical member of said music stand, said cylindrical member having a circular plate attached to each end of said cylindrical member, each of said circular plate has a centrally-located aperture;
   a bolt secured inside a cylindrical member;
   extensions rotatably coupled to said cylindrical member;
   holding means attached to said extensions for holding mutes to said cylindrical member;
   tensioning means for properly securing said mutes to said cylindrical member; and
   spring clip means attached to said cylindrical member suitable for protruding to distant portions of said cylindrical member, said spring clip members are made of flexible metals for attaching said cylindrical member to said vertical member of said music stand.

2. The mute holder of claim 1 wherein each said extensions comprises, at one end, an open-ended loop holder and a circular plate at the other end; said circular plate having a centrally-located aperture.

3. The mute holder of claim 2 wherein said open-ended loop holder attached to said extension comprises a flexible metal.

4. The removable mute holder of claim 1 wherein said holding means comprises an open-ended flexible loop so that said holding means may accomodate varied types of mutes.

5. The mute holder of claim 1 wherein said tensioning means comprises a bolt, a nut and a washer.

6. The mute holder of claim 5 wherein said bolt comprises a burr at the lower end of said bolt to prevent said bolt from fully passing through said aperture of the lower end of said cylindrical member.

7. The mute holder of claim 6 wherein said bolt further comprises a plurality of threads at the upper portion of said bolt to permit a nut to be screwed thereto for properly securing said extensions.

8. The mute holder of claim 7 wherein said nut comprises threads at the inside diameter of said nut having compatible threads of upper portion of said bolt to permit proper fastening of said nut into said bolt.

* * * * *